No. 763,565. PATENTED JUNE 28, 1904.
J. W. MADIGIN.
SECONDARY BATTERY.
APPLICATION FILED JAN. 10, 1903.

NO MODEL.

Witnesses
R. Shields
G. L. Batt

Inventor
J. W. Madigin
by Fetherstonhaugh & Co.
Attys

No. 763,565. Patented June 28, 1904.

UNITED STATES PATENT OFFICE.

JACOB WILFRID MADIGIN, OF TORONTO, CANADA.

SECONDARY BATTERY.

SPECIFICATION forming part of Letters Patent No. 763,565, dated June 28, 1904.

Application filed January 10, 1903. Serial No. 138,516. (No model.)

*To all whom it may concern:*

Be it known that I, JACOB WILFRID MADIGIN, of the city of Toronto, in the county of York, in the Province of Ontario, Canada, have invented certain new and useful Improvements in Storage or Secondary Batteries, of which the following is the specification.

My invention relates to improvements in storage or secondary batteries; and the object of the invention is to provide such a construction as will prevent the shedding of the active material and consequent short-circuiting, to insure immunity from buckling and a low internal resistance and high rate of discharge, and to provide for electrolytic action should the electrolyte sink low in the cell; and it consists, essentially, of a secondary battery provided with a plurality of electrodes, each of which is formed of a perforated and horizontally-corrugated sheet of lead provided with a stiff bounding-rim and a suitable terminal and active material pasted into and through the perforations and corrugations, so as to have the outer surface flat to cover the corrugations and be substantially flush with the bounding-rim of the plate and each plate or electrode being separated from the other by plates or sheets of fibrous cellulose or wood fiber, the parts being otherwise arranged and constructed in detail as hereinafter more particularly explained.

Figure 1:
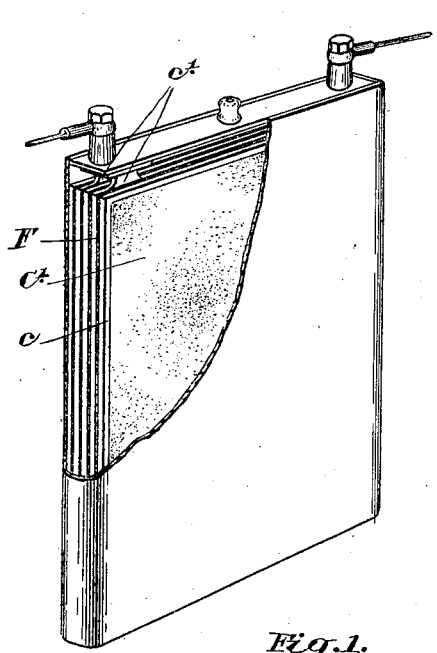
Figure 3:
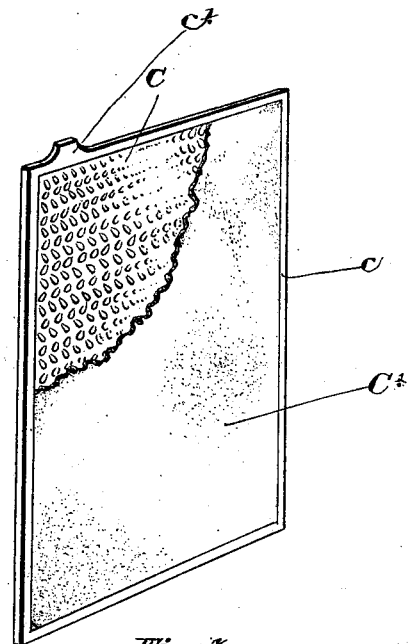
Figure 2:
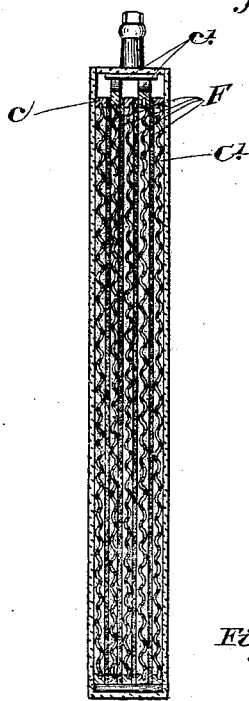
Figure 4:
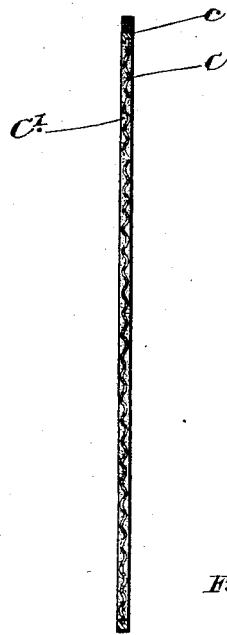

Figure 1 is a perspective view of a secondary battery, showing portion of the side of the cell broken away to exhibit the arrangement of the plates. Fig. 2 is a vertical section through the storage battery. Fig. 3 is a view of one of the plates, portion of the active material being broken away. Fig. 4 is a vertical section through the complete plate with the active material.

In the drawings like letters of reference indicate corresponding parts in each figure.

C is one of the electrodes or plates, which is formed out of sheet-lead, being first perforated and then corrugated horizontally and afterward placed in a mold and has burned or cast around its rim the stiffening or bounding rim $c$, with the terminal lug $c'$ at the top. The active material $C'$ is pasted through the perforations, so as to fill the corrugations and present a flat surface at each side of the plate, the active material being of sufficient thickness through and through, so as to cover the corrugations completely. The active material extends to the bounding-rim all around the plate and is preferably substantially flush with same on both sides of the plate. Between each plate C, I place a plate or strip F of fibrous cellulose or wood fiber, which is chemically treated with an ammoniacal salt. The separating-plates F are porous, and consequently the electrolyte by capillary attraction is drawn from the bottom of the cell up to the top of the electrodes. It will thus be seen that even if there is but little electrolyte in the cell electrolytic action will take place on account of the juxtaposition of the separating and insulating plates F and the capillary attraction resulting in the use of the separating material or plates between the electrodes. As the cell is completely filled from side to side and from edge to edge of the electrodes and the separating and insulating plates, it will be seen that the liability of short-circuiting is minimized, if not avoided, which is an important desideratum. For the same reason all danger of buckling is provided against and there is equal expansion from side to side. As each plate is made of a single sheet, it will be seen that a low internal resistance is insured, and consequently a resultant high rate of discharge. Seeing also that the insulating material is porous between the electrodes and fills up the space therebetween, it will be understood that the electrolytic action will be most advantageous and all shedding of the electrode will be avoided, and not only this, but also the insulating walls or plates between the electrodes will prevent sulfating or any deleterious action of the electrolyte on the grid of the electrode. As each electrode plate or grid is horizontally corrugated and is provided with a bounding-rim, it will be seen that as far as expansion and contraction is concerned the construction of my plate is extremely advantageous, as the corrugations make it elastic, and thereby the danger of buckling of the plate is reduced to a minimum.

What I claim as my invention is—

In a storage or secondary battery, an electrode comprising a perforated horizontally-corrugated plate having the perforations extending through the corrugations and finished free from projecting lips around the perforations, a solid reinforcing bounding-rim cast around the plate and burned to the edge thereof, and active material extending from bounding-rim to bounding-rim all over the plate and locked to the plate through the perforations and covering the entire surface on each side of the plate within the rim as and for the purpose specified.

JACOB WILFRID MADIGIN.

Witnesses:
M. McLaren,
B. Boyd.